United States Patent Office 3,778,402
Patented Dec. 11, 1973

3,778,402
POLYMERIZATION OF 2-PYRROLIDONE USING A CATALYST FORMED BY REACTION BETWEEN 2-PYRROLIDONE AND AQUEOUS KOH
Tomiaki Kimura, Yasuhiro Ohmura, Tamotsu Yoshimura, Katsuhisa Kohyama, and Kenzo Watanabe, Tokyo, Japan, assignors to Alrac Corporation, Stamford, Conn., and Mitsubishi Chemical Industries Limited, Tokyo, Japan
No Drawing. Filed Dec. 27, 1971, Ser. No. 212,682
Claims priority, application Japan, Dec. 28, 1970, 46/127,185
Int. Cl. C08g 20/18
U.S. Cl. 260—78 P
4 Claims

ABSTRACT OF THE DISCLOSURE 2-pyrrolidone is polymerized using potassium pyrroliodonate having been prepared by reaction between 2-pyrrolidone and an aqueous solution of KOH.

---

This invention relates to the polymerization of 2-pyrrolidone, and more particularly, to the polymerization of 2-pyrrolidone by using as the catalyst, potassium pyrrolidonate formed by reacting an aqueous KOH solution with 2-pyrrolidone.

Alkali metals, and hydrates, hydroxides and alcoholates of the alkali metals, etc. have been proposed as conventional catalysts to be used in the polymerization of 2-pyrrolidone. The hydroxides have been commonly used, and their use normally comprises adding the desired alkali metal hydroxide to the 2-pyrrolidone monomer, whereby the alkali metal pyrrolidonate and water are formed, and then the water is removed to leave a substantially anhydrous solution of alkali metal pyrrolidonate (as catalyst) in 2-pyrrolidone. Usually, the alkali metal hydroxide is dissolved in 2-pyrrolidone at a temperature of 60–100° C., which often causes side reactions such as an undesired hydrolysis of the 2-pyrrolidone. Consequently, it has been the practice to use as little water as possible in preparing the alkali metal salt of 2-pyrrolidone by reaction of 2-pyrrolidone with the alkali metal hydroxide. Normally solid KOH pellets (KOH 85%, water 15%) and NaOH pellets (NaOH 95%, water 5%) have been employed, but the pellets were sometimes harmful to the thermally sensitive 2-pyrrolidone due to the heat generated when the pellets were dissolved in the 2-pyrrolidone.

Unexpectedly, we have found that an aqueous KOH solution is readily soluble in 2-pyrrolidone to give a solution of potassium pyrrolidonate in 2-pyrrolidone from which the water can be removed immediately, and the resultant anhydrous solution can be used to polymerize the 2-pyrrolidone monomer as well as or better than a solution of potassium pyrrolidonate in 2-pyrrolidone prepared from KOH pellets of little water content.

It is highly advantageous and convenient to use an aqueous KOH solution, rather than solid KOH, particularly when preparing solutions of potassium pyrrolidonate in 2-pyrrolidone of relatively high potassium pyrrolidonate concentration. For example, since an aqueous KOH solution can be readily mixed with 2-pyrrolidone, the use of aqueous KOH solutions to form the potassium pyrrolidonate lends itself to the development of a continuous process for polymerization of 2-pyrrolidone, whereas the use of KOH pellets to form the pyrrolidonate partakes of the nature of a batch operation. Such high concentrations are encountered in the polymerization of 2-pyrrolidone, such as 0.5 to 50 weight percent, based on the 2-pyrrolidone monomer, preferably 1 to 30 weight percent, most preferably 8 to 20 weight percent.

We generally use an aqueous KOH solution having a KOH content of 65%, by weight, preferably 10 to 60%. When the concentration is under 10%, a large amount of water is added, thereby increasing the work in removing water. When the concentration exceeds 60%, the KOH is not easily soluble and KOH may separate out at a lower temperature.

In order to practice this invention effectively, the alkali metal hydroxide must be KOH, for the merits of this invention cannot be obtained by means of any other hydroxides of the alkali metals. That is, when adding an aqueous solution of an alkali metal hydroxide to 2-pyrrolidone, only KOH can be readily and uniformly mixed with 2-pyrrolidone and can be subjected to the removal of water without separating to give a substantially anhydrous catalyst solution. Table 1 shows the appearances of aqueous solutions of various alkali metal hydroxides during the addition of the solutions of 2-pyrrolidone and during the removal of water.

TABLE 1

| Alkali metal hydroxide | Appearance of solutions— | |
|---|---|---|
| | During the addition of the aqueous alkali metal hydroxide solution | During the removal of water |
| LiOH | Separated out | Not dissolved. |
| NaOH | do | Dissolved at 75–85° C. |
| KOH | Dissolved uniformly | Uniform. |
| RbOH | 2-phase separation | Dissolved after separation. |
| CsOH | Dissolved uniformly | Do. |

Although the depression in the polymerization is more predominant with an aqueous KOH solution than with KOH pellets if the period between KOH addition to the pyrrolidone and the removal of water is considerably long, there was only a little difference in the polymerization between an aqueous KOH solution and KOH pellets when the water was removed immediately after the KOH addition. Particularly, both the pellets and the aqueous solution gave the same results in the practical range of the polymerization degree (i.e. conversion of monomer to polymer) of 60 to 70%. In addition, when trying to dissolve a large quantity of KOH in 2-pyrrolidone, the KOH pellets must be dissolved at high concentration, which requiries a long period of time for dissolving, thereby deleteriously affecting the polymerization. In contrast, the aqueous KOH solution can be readily mixed with -pyrrolidone to produce a uniform solution of potassium pyrrolidonate in 2-pyrrolidone, thus providing a catalyst solution of high concentration of potassium pyrrolidonate without deleteriously affecting the polymerization.

In practicing this invention, it is preferable to use one or more of the conventional polymerization initiators or promoters, such as the N-acyl activators, e.g. N-acetylpyrrolidone, isocyanates, and $CO_2$.

This invention will be more fully explained by the following examples. It will be understood that this invention is not restricted by these examples. The inherent viscosity reported in the examples and experiments herein is measured at 30° C. by dissolving 0.1 parts of polypyrrolidone in 20 parts of 85% formic acid. Parts in the examples and experiments are parts by weight. All references to KOH pellets in the examples and experiments are to KOH pellets assaying 85% KOH, the remainder being water (~15%) and inerts.

EXAMPLE 1

4.8 parts of 50% aqueous KOH solution (equivalent to 2.8 parts of KOH pellets) were added to 110 parts of 2-pyrrolidone at room temperature to give a uniform solution. The solution was heated under vacuum to distill over the water, the heating being stopped when 2-pyrrolidone began to distill over, thereby assuring subtsantially complete removal of water. The resultant anhydrous solution, containing 0.02 wt. percent of water, was cooled to room temperature and 1.2 parts of N-acetylpyrrolidone were added to and thoroughly mixed with the solution. Polymerization was conducted at 50° C. The conversion to polymer was 69.0% at the end of 4 hours, and the inherent viscosity of the polymer was 0.89.

COMPARATIVE EXPERIMENT A

To 110 parts of 2-pyrrolidone were added 2.8 parts of KOH pellets (85% assay) at room temperature, immediately followed by the removal of water by heating under a pressure of 2 to 3 mm. Hg. The KOH pellets were dissolved at 60 to 65° C. about 5 minutes after the heating was started. The heating was stopped when the internal temperature reached 110° C. and 2-pyrrolidone began to distill over, and the resultant anhydrous solution was cooled to room temperature. 1.2 parts of N-acetylpyrrolidone were added to and mixed with the solution, and polymerization was conducted at 50° C. After 4 hours the conversion to polymer was 70% and the inherent viscosity of the polymer was 0.76.

EXAMPLE 2

8.5 parts of a 50% aqueous KOH solution (equivalent to 5 parts of KOH pellets) were added to 110 parts of 2-pyrrolidone at room temperature to readily obtain a uniform solution. The pressure was reduced to 2 to 3 mm. Hg at once and the solution was heated to remove water. The heating was stopped when 2-pyrrolidone began to distill out and the solution was cooled to room temperature at the reduced pressure. $CO_2$ gas was passed into the solution, while still under vacuum, to give about 1/3 mols $CO_2$ per mol (equivalent) of K. Polymerization was conducted at 50° C. After 96 hours the polymerization degree and the inherent viscosity were 69.4% and 4.0, respectively.

EXAMPLE 3

The procedure of Example 2 was followed except that 14.2 parts of a 30% aqueous KOH solution (equivalent to 5 parts of KOH pellets) were used per 110 parts of 2-pyrrolidone to form the anhydrous solution of potassium pyrrolidonate in 2-pyrrolidone. After 96 hours at 50° C. the conversion to polymer was 71% and the inherent viscosity was 4.4.

COMPARATIVE EXPERIMENT B 5 parts of KOH pellets were added to 110 parts of 2-pyrrolidone at room temperature and the pressure was immediately reduced to 2 to 3 mm. Hg, followed by heating. The KOH pellets began to dissolve at 60 to 65° C., about 5 minutes after the heating was started. The procedure of Example 2 was then followed to form an anhydrous solution of potassium pyrrolidonate in 2-pyrrolidone, which was polymerized at 50° C. to give a conversion of 71.3% and an inherent viscosity of 4.2 after 96 hours using $CO_2$ as the polymerization initiator.

EXAMPLE 4

The procedure of Example 2 was followed except that 8.5 parts of a 50% aqueous KOH solution were added to 110 parts of 2-pyrrolidone maintained at 110° C., and the pressure was immediately reduced to 2 to 3 mm. Hg to remove the water. The anhydrous solution of potassium pyrrolidonate in 2-pyrrolidone was polymerized at 50° C. to obtain a conversion of 68.5% and an inherent viscosity of 3.9 after 96 hours.

COMPARATIVE EXPERIMENT C 5 parts of KOH pellets were added to 110 parts of 2-pyrrolidone maintained at 80° C., followed by heating at the same temperature under atmospheric pressure for 20 minutes to dissolve the KOH pellets. The pressure was immediately reduced to 2 to 3 mm. Hg and the heating was continued to raise the temperature. The procedure of Example 2 was then followed to form the anhydrous solution of potassium pyrrolidonate in 2-pyrrolidone which was polymerized, using $CO_2$ as the polymerization activator, to give 39.3% conversion to a polymer having an inherent viscosity of 2.7 after 96 hours.

EXAMPLE 5

The procedure of Example 2 was followed except that 25.7 parts of a 50% aqueous KOH solution (equivalent to 15 parts of KOH pellets) were added to 110 parts of 2-pyrrolidone. The polymerization, using $CO_2$ as the polymerization activator, gave conversions of 19.9% and 53% and inherent viscosities of 4.12 and 3.5 after 8 and 48 hours, respectively.

COMPARATIVE EXPERIMENT D 15 parts of KOH pellets were added to 110 parts of 2-pyrrolidone, followed by the procedure of Comparative Experiment B and a dissolving time of 10 minutes to form the anhydrous solution of potassium pyrrolidonate in 2-pyrrolidone. $CO_2$ was then added. The result was a conversion to polymer of 17.1% and 47% and inherent viscosities 3.68 and 3.0 after 8 and 48 hours, respectively.

Example 1 and Experiment A used an N-acyl activator, whereas Examples 2–5 and Experiments B, C and D used $CO_2$ as the polymerization activator. All of the examples and Comparative Experiments used the same polymerization temperature of 50° C.

We claim:
1. In a process for the polymerization of 2-pyrrolidone to form a solid polymer of 2-pyrrolidone, in which 2-pyrrolidone is reacted with KOH to form a solution of potassium pyrrolidonate in 2-pyrrolidone water is removed from said potassium pyrrolidonate solution, and the 2-pyrrolidone in the resultant substantially anhydrous solution of potassium pyrrolidonate in 2-pyrrolidone is polymerized in the presence of a polymerization initiator, the improvement which comprises supplying the KOH reactant to said reaction of KOH and 2-pyrrolidone solely as an aqeuous KOH solution.
2. The process according to claim 1, wherein the aqueous KOH solution contains a maximum of 65% by weight of KOH.
3. The process according to claim 1, wherein the aqueous KOH solution contains 10 to 60% by weight of KOH.
4. The process according to claim 1, wherein the polymerization is effected in the presence of $CO_2$ as a polymerization initiator.

References Cited
UNITED STATES PATENTS

| | | | |
|---|---|---|---|
| 2,638,463 | 5/1953 | Ney et al. | 260—78 P |
| 2,907,755 | 10/1959 | Laotenschlager et al. | 260—78 P |
| 3,016,366 | 1/1962 | Glickman et al. | 260—78 P |
| 3,060,153 | 10/1962 | Follett | 260—78 P |
| 3,180,855 | 4/1965 | Black | 260—78 P |
| 3,682,869 | 8/1972 | Jarovitzky | 260—78 P |

HAROLD D. ANDERSON, Primary Examiner

U.S. Cl. X.R.

260—31.2 N